July 30, 1957  R. J. QUICK  2,800,879
ANIMAL GROOMING IMPLEMENT
Filed April 13, 1956
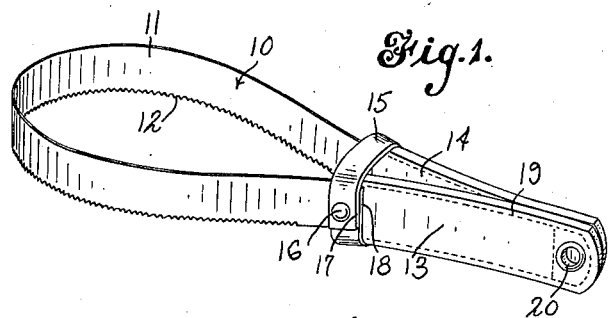
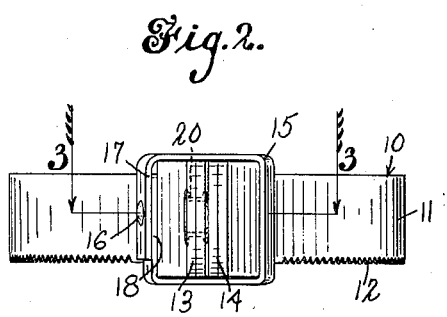
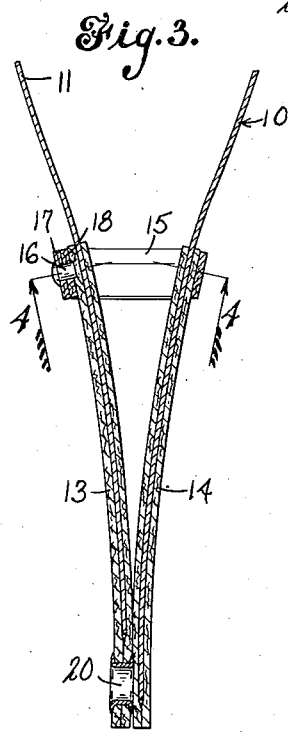
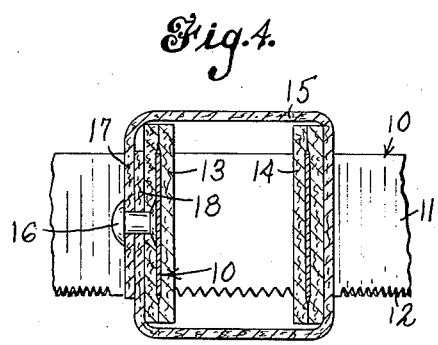
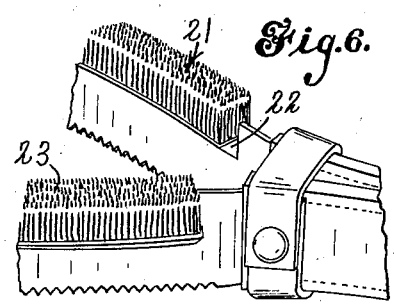
INVENTOR
Robert J. Quick
BY Rockwell & Bartholow
ATTORNEYS

United States Patent Office 2,800,879
Patented July 30, 1957

2,800,879

ANIMAL GROOMING IMPLEMENT

Robert J. Quick, New Haven, Conn.

Application April 13, 1956, Serial No. 578,130

5 Claims. (Cl. 119—92)

This invention relates to animal grooming implements and has particular reference to implements for giving grooming treatment to animals by combing, scraping or dressing the outer coat which may be of hair, fur or the like. The implement is well adapted to the operation of "shedding out" horses, for example, but with the implement made in a small size it is well adapted for use on small animals.

An object of the invention is to provide an implement having a very effective grooming or dressing action on the animal's coat and which can be handled and manipulated by the user with more facility and convenience than has been possible heretofore.

To this and other ends the invention consists in the novel features and combinations of elements hereinafter described and pointed out in the appended claims.

In the accompanying drawing:

Fig. 1 is a perspective view showing a grooming implement embodying the invention;

Fig. 2 is an enlarged rear elevation of the article;

Fig. 3 is an enlarged section on line 3—3 of Fig. 2;

Fig. 4 is an enlarged section on line 4—4 of Fig. 3;

Fig. 5 is an edge view of the implement showing the same when opened or extended for two-hand operation; and Fig. 6 is a detail perspective showing a modified form.

The article, as shown in the drawing, embodies a grooming blade preferably made of spring steel and in general similar to an elongated narrow, thin, flexible saw blade. This blade is shown in Fig. 1 as having grooming teeth along one edge, these being provided along the main or middle part of the blade and the ends of the blade being extended into and held in suitable flat socketed handles. One of the handles is provided adjacent its forward end with a looped member acting as a retainer, and with the blade bent into a loop and the ends held in the respective handles, the retainer holds the working part of the blade in a loop form, as shown in Fig. 1.

In Fig. 1, the blade is indicated generally at 10, the looped working portion thereof at 11, the grooming or scraping edge of the same at 12, one of the handles at 13, the other handle at 14, at 15 the looped retainer, and at 16 the means by which the retainer is fastened to the handle 13. The edge 12 of the blade is, in this case, provided with teeth which are similar to saw teeth and suitable for the intended purpose.

The handles 13 and 14 and also the retainer 15 may be made of leather or other suitable flexible material. The fastening means 16 may be constituted by a rivet passing through overlapping portions 17 and 18 of the strap of which the retainer loop is made, and passing through one side of the handle member 13. Each handle member in this form comprises two strips of leather that are sewed together by lines of stitching along their side edges and at their rear ends, as indicated at 19 in Fig. 1. Between the opposite lines of stitching the handles have sockets open at the forward ends and these sockets are of a size such that the respective ends of the blade can be pushed into the respective handles and during ordinary use will be firmly held in this relationship. Fig. 3 shows how under the spring action of the blade, having its ends extended into the rear ends of the handles, the loop member 15 will be extended laterally and held taut. The result is that the handles will be held in the converging relationship shown in Fig. 3. The toothed part of the blade is thus held in a loop form with the rearward portions of the toothed part converging so as to be more or less in line with the blade parts within the duplex handle. The rear ends of the handle members 13 and 14 are in contact with each other. The loop or holder 15 imposes lateral restraint on the blade to maintain its looped form.

In this particular form, the handle 13 is provided rearwardly with a grommet 20 by means of which the implement can be suspended from a nail or hook when the implement is extended.

It is understood from the foregoing that the blade ends are withdrawable from the socketed members of the duplex handle. By removing the handle member 14 from its associated blade terminal the implement can be converted to the straight, substantially planar elongated shape shown in Fig. 5. To do this, the loop of the blade is pressed to narrow it, and the terminal in member 14 pulled lengthwise to free it from the handle socket and the holding loop 15. The blade will then return by spring action to a straight form. Thus it is possible to convert the article readily from the shape of Fig. 1, in which the looped blade can be manipulated by one hand, to the shape in which the blade can be manipulated by grasping the ends of the article by the respective hands of the user. In the shape of Fig. 5, the article can be used for scraping the coats of horses and other large animals with the blade engaging large areas. In the shape of Fig. 1, it can be used to clean or groom various smaller areas such, for example, as the legs or areas difficult of access.

In the form of Fig. 6, the blade instead of having a plain, smooth edge along one side is provided along the corresponding side with a brush portion 21 having a body 22 applied to the blade edge, said body being provided with bristles 23. Preferably the body 22 is made of vulcanized rubber or similiar material in which the bristles are set, and the brush element extends over substantially the length of the working blade portion, that is, the portion not covered by the handle members.

If desired, the long, narrow, thin blade may be toothed along both top and bottom edges. Also, if desired, the article can be made in smaller sizes for use on smaller animals, such as dogs and cats. In such case the user will, in most cases, find it unnecessary to convert the article to the straight extended shape. The article has distinct merit when used exclusively in the looped form, as in this form the blade is securely held as a result in part of its inherent resiliency, while permitting removal of the blade when for one reason of another that is desirable. When the duplex handle is made of leather or other flexible durable material the article will give satisfactory service over a long period. When necessary a new blade can be readily installed.

The invention provides a new implement for the stated purposes and like purposes which is conveniently handled and manipulated by the user and serves very effectively for cleaning or otherwise treating the coat of the animal thoroughly throughout areas or parts desired to be cleaned or groomed.

In the present disclosure (Fig. 3), the terminal converging portions of the blades have close adjacency at their rear extremities but on account of the provision of the grommet 20, the blade extremity in member 13 is forwardly of the other extremity.

In the Fig. 1 form, the loop applied to one handle member extends about the mouth portion of the other handle member and the rear ends of said members are in contact with each other. The handle members are elongated, substantially flat members of flexible material presenting opposing walls between which the blade terminals are engaged.

Various changes in structural details may be made without departure from the scope of the appended claims.

What I claim is:

1. An implement such as described comprising a springy long narrow blade provided in its middle portion and in regions extending therefrom toward but not to its ends with at least one grooming side edge, the terminal portions of said blade each being of substantial length, said blade being formed in a loop such that said terminal portions converge and present closely adjacent rear extremities, separate socketed converging handle members into which said terminal portions are extended for being secured therein, and means associated with the forward parts of said handle members imposing lateral restraint upon the blade for maintaining its loop shape.

2. An implement as defined in claim 1, in which said restraint-imposing means comprises a loop extending laterally from one of said handle members.

3. An implement as defined in claim 1, in which said handle members are elongated substantially flat members presenting opposing walls between which the blade terminals are engaged, and in which the rear ends of said handle members are in contact with each other.

4. An implement such as described comprising a springy long narrow blade provided in its middle portion and in regions extending therefrom toward but not to its ends with at least one side edge formed to act as a scraper, the terminal portions of said blade being in one piece therewith and each presenting plain side edges, said blade being formed in a loop such that said terminal portions converge in a rearward direction and have their rear extremities in close adjacency, separate socketed converging handle members in which said terminal portions are engaged for secure holding therein, said handle members being abutted against each other at their rear ends and spaced from each other at their forward ends, and a flexible loop element attached to the forward end portion of one of said members and extending toward and about the forward end portion of the other member and imposing lateral restrait upon the blade rearwardly of its scraping or working edge so as to maintain the loop shape of the blade, said other member being withdrawable from said loop element so that said blade can be straightened.

5. An article such as described comprising a springy elongated narrow blade provided in its middle portion with at least one grooming side edge, said blade having as continuations thereof terminal portions of substantial length, said terminal portions being in substantially the same plane as the middle portion, a handle associated with each terminal portion, and a loop element fastened to one handle in a location where it is spaced inwardly from the extremity of the article, said loop element being engageable by the other handle to retain the latter in a position in which an initially straight blade is of loop form.

References Cited in the file of this patent
UNITED STATES PATENTS

| | | |
|---|---|---|
| 130,755 | Shippey | Aug. 20, 1872 |
| 202,769 | Washburn | Apr. 23, 1878 |